US011410218B1

(12) United States Patent
O'Brien et al.

(10) Patent No.: US 11,410,218 B1
(45) Date of Patent: Aug. 9, 2022

(54) METHOD AND SYSTEM FOR SMART SHOPPING ASSISTANT

(71) Applicant: UIPCO, LLC, San Antonio, TX (US)

(72) Inventors: Kelsey Anne O'Brien, Austin, TX (US); Meredith Beveridge, Morrison, CO (US); Eric David Schroeder, San Antonio, TX (US); Manfred Amann, San Antonio, TX (US); Matthew Ryan Santacroce, San Antonio, TX (US); Kelly Q. Baker, San Antonio, TX (US); Donnette L. Moncrief Brown, San Antonio, TX (US); Justin Dax Haslam, San Antonio, TX (US); Timothy Frank Davison, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 17/243,098

(22) Filed: Apr. 28, 2021

Related U.S. Application Data

(60) Provisional application No. 63/017,536, filed on Apr. 29, 2020.

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0631* (2013.01); *G06Q 30/0633* (2013.01); *G06Q 30/0639* (2013.01); *G06Q 30/0643* (2013.01)

(58) Field of Classification Search
None
See application file for complete search history.

(56) References Cited

U.S. PATENT DOCUMENTS

| 2013/0282519 A1* | 10/2013 | Xavier | G06Q 30/00 705/26.7 |
| 2014/0244442 A1* | 8/2014 | Hirsch | G06Q 30/0633 705/26.62 |
| 2018/0130114 A1* | 5/2018 | Hawkins | G06Q 30/0631 |

(Continued)

OTHER PUBLICATIONS

Katakuri, Jayasimha, Post-purchase recommendations in large-scale online marketplace, Oct. 1, 2015, 2015 IEEE International Conference on Big Data, pp. 1299-1305 (Year: 2015).*

*Primary Examiner* — Jeffrey A. Smith
*Assistant Examiner* — Timothy J Kang
(74) *Attorney, Agent, or Firm* — Plumsea Law Group, LLC

(57) ABSTRACT

A method and system of providing product-specific information to a user during shopping excursions is disclosed. The user can access a smart shopping assistant application to search for supplemental items that may need to be purchased in order to assemble or implement a desired product. The user can maintain a current home inventory of tools and products through the application to quickly determine whether any of the supplemental items are already in the user's possession. The application can also guide the user from their current location to the location of the required item, as well as present reminders to the user about the supplemental items during their shopping trip to ensure the user returns home with all of the required items.

16 Claims, 12 Drawing Sheets

(56) References Cited

U.S. PATENT DOCUMENTS

| | | | | |
|---|---|---|---|---|
| 2018/0285958 A1* | 10/2018 | Bender | .............. | G06Q 30/0631 |
| 2020/0160253 A1* | 5/2020 | Johnson | ......... | G06Q 10/063114 |
| 2020/0233916 A1* | 7/2020 | Hoots | ................. | G06F 16/9538 |

* cited by examiner

METHOD AND SYSTEM FOR SMART SHOPPING ASSISTANT

CROSS-REFERENCE TO RELATED APPLICATION

This application claims the benefit of U.S. Provisional Patent Application Ser. No. 63/017,536 filed on Apr. 29, 2020 and titled "Smart Shopping Assistant", the disclosure of which is incorporated by reference in its entirety.

TECHNICAL FIELD

The present disclosure generally relates to a method and system for providing users with real-time intelligent guidance and navigation, and specifically to a method for improving the user's shopping experience by providing supplemental information about a product while the user is browsing a retail environment.

BACKGROUND

Shoppers often have to make multiple trips to multiple locations to obtain the items on their shopping lists. In addition, a shopper may know that a particular item is or may be available at a store, but does necessarily know whether the use or assembly of such an item requires additional supplemental items that the shopper does not currently own. A shopper may return home to realize they could not enjoy their purchase because of a failure to obtain the necessary accessories or tools to install their product. In some cases, a shopper may become aware that additional items are needed while shopping, but be unsure or unfamiliar as to the location or availability of such items. These factors often combine together resulting in waste of time and money of the shoppers driving or walking around to acquire the different items needed in an inefficient manner.

There is a need for product searching and intelligent shopping lists on a mobile device that provides more immediate information to the shopper to make better purchasing decisions and a system and method that addresses the shortcomings discussed above.

SUMMARY

In one aspect, a method of providing product-specific information to a user is disclosed. The method includes steps of receiving, from a first computing device, a first input including identifying information for a first product, and then identifying, based on the first input and reference to a product database, the first product. The method also includes determining, based on the identity of the first product and reference to the product database, that at least a first supplemental item is recommended for implementation of the first product, and then causing to be displayed, at the first computing device, information about at least the first supplemental item.

In another aspect, a smart assistant system providing product-specific information to a user includes a processor and machine-readable media. The machine-reading media include instructions which, when executed by the processor, cause the processor to receive, from a first computing device, a first input including identifying information for a first product, and to identify, based on the first input and reference to a product database, the first product. The instructions further cause the processor to determine, based on the identity of the first product and reference to the product database, that at least a first supplemental item is recommended for implementation of the first product, and to cause to be displayed, at the first computing device, information about at least the first supplemental item.

In another aspect, a system for providing product-specific information to a user includes means for means for receiving, from a first computing device, a first input including identifying information for a first product, and means for identifying, based on the first input and reference to a product database, the first product. The system also includes means for determining, based on the identity of the first product and reference to the product database, that at least a first supplemental item is recommended for implementation of the first product, and means for causing to be displayed, at the first computing device, information about at least the first supplemental item.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide methods and systems to improve day-to-day shopping experiences for users. Specifically, the proposed methods and systems offer the convenience of a smart shopping assistant ("smart assistant"). The smart assistant can be configured to track the items a user is planning to purchase, is considering purchasing, or has just purchased. The smart assistant can then determine whether the user already has any tools and/or other items needed for assembling or employing that item. For example, if the user is purchasing a bookshelf, the system can determine whether the user already owns or otherwise has indicated that they have access to the necessary tools to help assemble the bookshelf. Similarly, if the user is purchasing a system that requires batteries, the system can check if the user already has batteries at home by reference to a previously generated inventory complied by the smart assistant and user. If the user does not already have certain items, the system can automatically remind the user about these items, locate those items in the store, and/or provide route guidance to the user. For example, the system may provide a route on a map of the store from a particular starting location to the desired isle where the needed item is located. In some cases, the system could be integrated with a user's car so that the car will not start, or provides a warning, if the user tries to leave without the necessary items being purchased.

Figure 1:
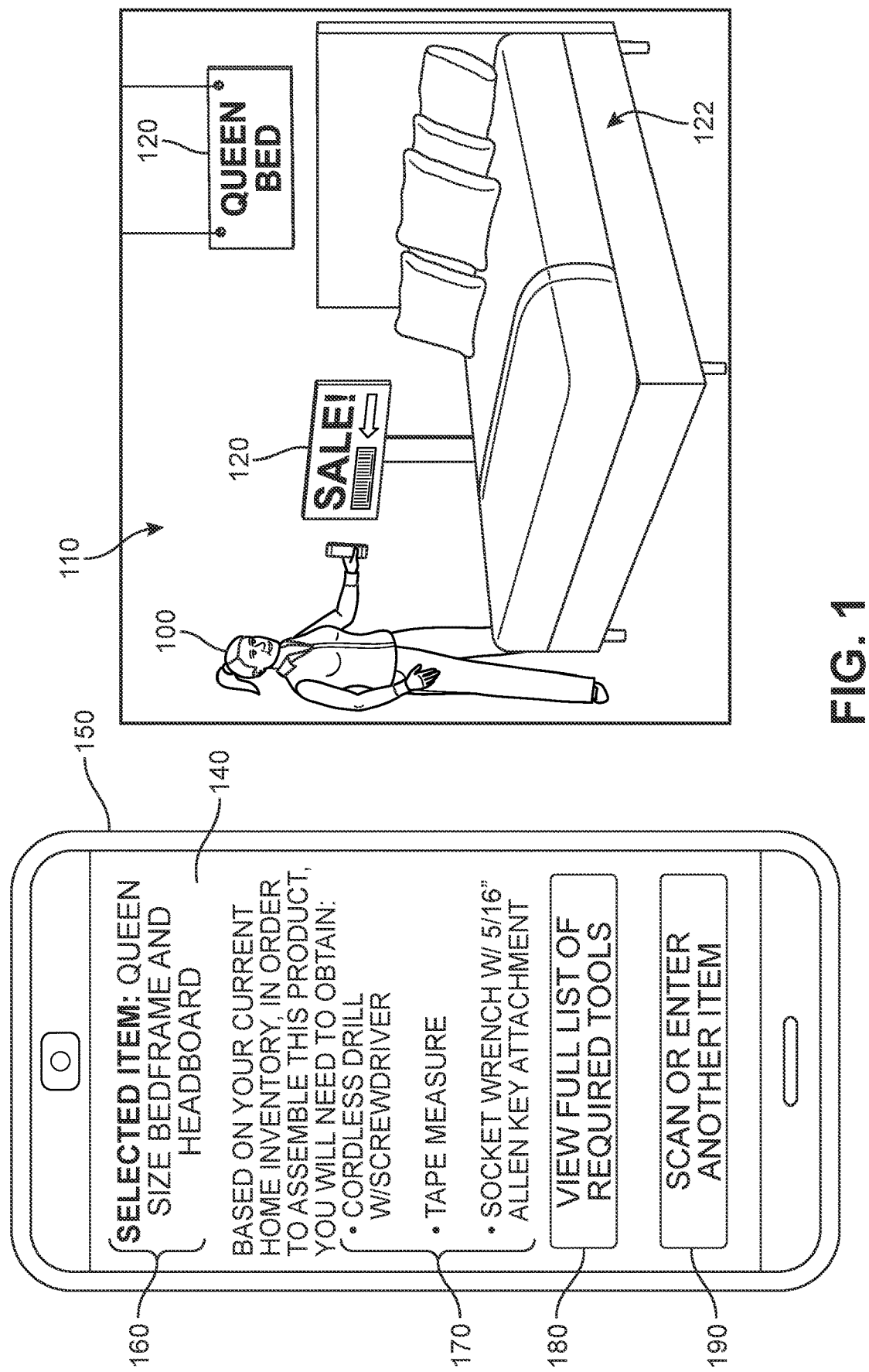
FIG. 1 is an example of a user viewing a bed for sale at a retail location while accessing supplemental information about the product via a smart assistant application on her mobile device, according to an embodiment.

For purposes of clarity, an overview of one embodiment of the proposed systems and methods is illustrated with reference to FIG. 1. In FIG. 1, a first user 100 of a smart assistant is holding a portable computing device ("portable device") 150 while visiting a first store 110 and shopping for bedroom furniture 120. In this example, the portable device 150 is a mobile device in the form of a smartphone. The portable device 150 includes a smart assistant application ("application") 140, an aspect of which is currently displayed on the smartphone screen via a user interface. In FIG. 1, the first user 100 has captured an image or otherwise scanned data corresponding to an identification code 130 or any other unique identification marking for the desired product (here shown as a bedframe 122). In other embodiments, the first user 100 can instead input a description of the product manually to search for the item from a product directory.

In response to receiving this input (identification code 130), the application 140 is configured to identify the product details 160 and automatically generate a list 170 (e.g., cordless drill with screwdriver, tape measure, socket wrench with 5/16" Allen Key attachment) describing the tools, services, or other supplemental items that would also need to be obtained by the user if this product were purchased. As used herein, the term "supplemental item" refers to any item such as a tool, power supply, specification, or other accessory, product, and/or service that is recommended or required for use with a specific product in order to enjoy, assemble, install, utilize, employ, or otherwise implement the specific product. The supplemental item typically is not included in the purchase of the specific product, and so is generally expected to be provided by the user. This list 170 can be limited to items that the user does not currently own. For example, in some embodiments, the application 140 can offer a first selectable option 180 ("View full list of required tools") for viewing the full list of items needed irrespective of whether the first user 100 currently owns these items. A second selectable option 190 ("Scan or enter another item") can be offered to allow the user to search for another item. In different embodiments, the list 170 that is displayed can help first user 100 ensure that the process of incorporating the desired item into their home will be streamlined and efficient. As will be discussed in greater detail below, the application 140 can offer a variety of features, such as reminders, alerts, maps, supplemental information, and/or suggestions that can vastly simplify the shopping experience for most users.

Figure 2:
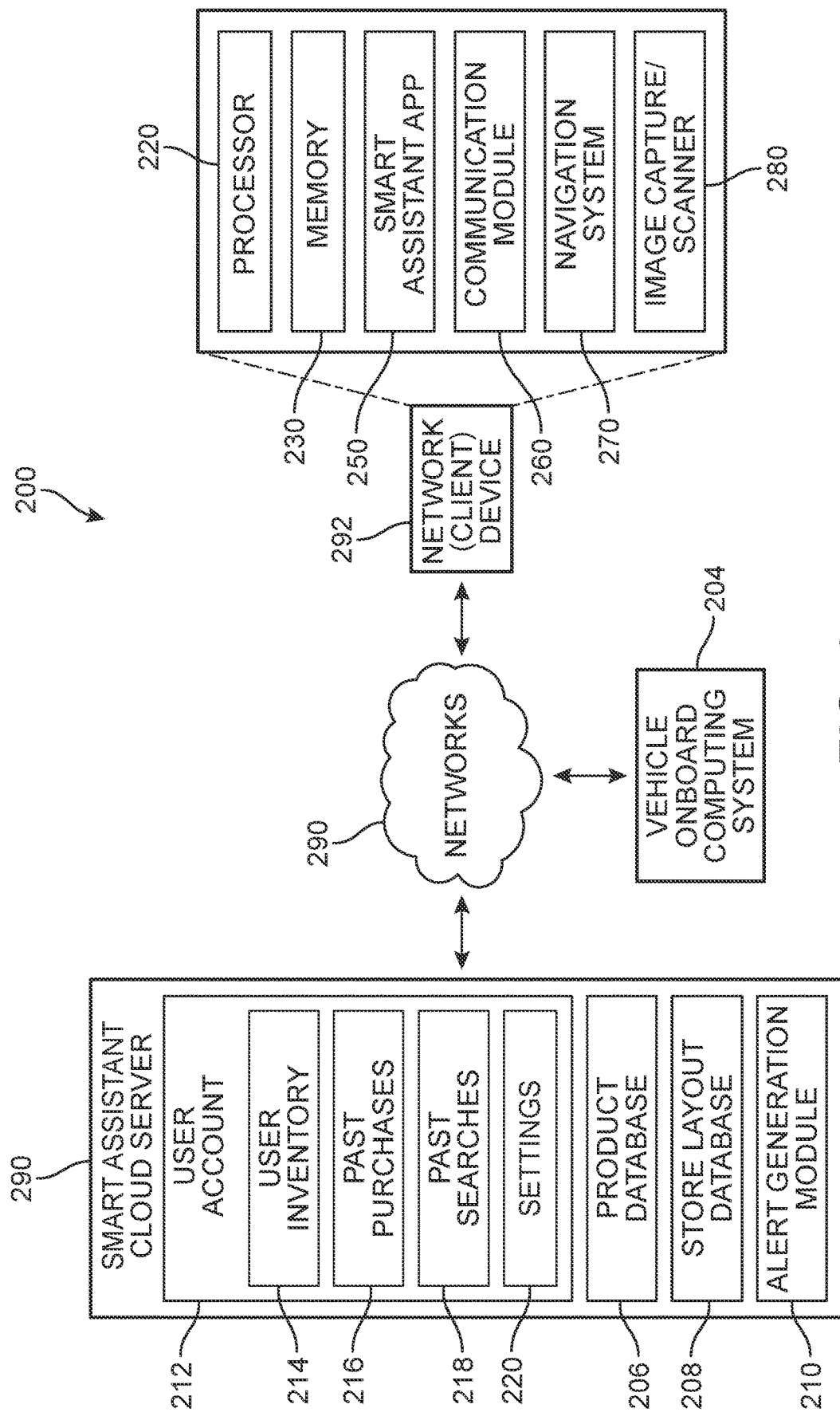
FIG. 2 is a schematic diagram of a smart assistant system, according to an embodiment.

In order to provide the reader with a greater appreciation of the embodiments to the reader, FIG. 2 depicts an overview of an embodiment of a smart assistant system ("system") 200. As shown in FIG. 2, the system 200 includes a network or client computing device ("client device") 292 that is configured to communicate over one or more networks 290 to a smart assistant cloud server ("server") 202. Client device 292 can refer to any computing device such as a desktop or laptop computer or mobile phone, tablet, or other computing device.

Networks 290 could include one or more Wide Area Networks (WANs), Wi-Fi networks, Bluetooth or other Personal Area Networks, cellular networks, as well as other kinds of networks. It may be appreciated that different devices could communicate using different networks and/or communication protocols. The devices can include computing or smart devices as well as more simple speakers or light-emitting devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections.

In different embodiments, the client device 292 may include provisions for communicating with, and processing information from, nearby networks and/or devices. As seen in FIG. 2, client device 292 may include one or more processors 224 and memory 230. Memory 230 may comprise a non-transitory computer readable medium. Instructions stored within memory 230 may be executed by the one or more processors 224. Client device 292 may also include a local or remotely accessed smart assistant application ("application") 250, a communication module 260, a navigation system 270, and an image capture and/or scanner component or mechanism ("input mechanism") 280. Communication module 260 may include radios or other provisions for communicating using one or more communication methods. In particular, communication module 260 includes provisions for communicating with other nearby devices and data services over networks 290. For example, a communication module could include a Wi-Fi radio, a Bluetooth radio, and/or a cellular network radio.

In addition, navigation system 270 may comprise any system capable of providing directions and/or other kinds of routing information between two or more locations as well as determining the user's current location, as well as a GPS receiver that can receive GPS information. In other cases, navigation system 270 can include other receivers capable of receiving global or local positioning information. Additionally, navigation system 270 may comprise maps and/or information from other kinds of geographic information systems (GIS) that can be used to generate navigation routes for a driver. In some cases, navigation system 270 can provide directions in an outdoor environment. In other cases, navigation system 270 can provide directions in an indoor environment. In some cases, navigation system 270 may provide directions in both outdoor and indoor environments.

In some embodiments, an end-user can interact with and adjust settings associated with the proposed system, for example via application 250 running on or accessed through client device 292. In some embodiments, the application 250 can offer a device registration and/or profile interface ("interface") for implementing the smart assistant system 200. In some embodiments, an application may be available that connects a user's device (for example, via a WiFi or cellular connection) with an online service provider or manager. For example, application 250 may connect to a smart assistant cloud server ("server") 202 via networks 250 to access or download the application 250, create a user account 212, customize their preferences or settings 220, generate a smart user inventory ("inventory") 214 of tools and items owned by the user, and in some embodiments, to maintain a record of the user's past purchases 216, past searches 218 for updating inventory records and determining which messages or alerts should be presented to the user, for example, via an alert generation module 210.

In different embodiments, the smart user inventory 214 can be understood to offer a dynamic, interactive repository or database of user-specific inventory data and automated data analysis. In some embodiments, with every purchase, the smart assistant system 200, with reference to the inventory 214, can be configured to determine whether the item being purchased is a "consumable" (e.g., items that will be used within a specific period such as cleaning supplies, batteries, or other items that will perish within a certain time or have an expiration or best-by date, such as groceries) or products that are considered more "permanent" (e.g., most tools, furniture, most electronics, vehicles such as cars and bikes, personal items such as cloths, jewelry and household items such as cookware, dinnerware, or other items expected to last for the lifetime of the user, etc.). As some non-limiting examples, inventory data can be maintained by or incorporate interactive software such as Sortly, Memento Database, Nest Egg, MyStuff, Magic Home Inventory, BluePlum Home Inventory, Smart Inventory System, Certify by Emburse, Tradeshift, DiCentral EDI & Supply Chain Solutions, Webgility, Dynamics 365 Business Central, Kintone, Coupa Procurement, Fishbowl Inventory, and/or SKUVault, or other types of inventory management software.

For consumable items, the system 200 is configured to estimate the item's lifespan (or timeframe for how long they're expected to be useful) based on learned data about these types of products. For example, such data may be based on a collection of anonymized data from a large group of users, and/or from data provided by the manufacturer or supplier (e.g., the use-by date on groceries). This information would be included in the inventory 214 to make the user aware of what's currently available and usable. For example, a person might buy certain ingredients for a meal and the inventory 214 is configured to offer guidance as to whether the person already has some of the other ingredients and if those are still usable. As another example, a person may purchase a battery-operated item (e.g., a toy) and the inventory 214 would be able to provide inventory information about the user's current stock of batteries and whether they are still within their useful shelf-life.

Similarly, for permanent goods, the inventory 214 is configured to include purchase information (date, price, vendor, etc.), purchase receipts, manufacturer information (if applicable), warranty and maintenance information (if applicable), user manual (if applicable), and estimated date when the item might need to be replaced (if applicable), for example by reference to past purchases 216. In addition, in some embodiments, the value of the item can be tracked over time, and an estimate about the depreciated value can be presented to the user. For example, if the person purchases a new appliance (e.g., a water heater), the inventory 214 would automatically record all information related to this specific water heater product and the associated purchase data. This information can be used by system 200 to provide information and alerts to the user regarding repairs and required or suggested maintenance actions. For example, the system 200 can be configured to send an alert to the user to their mobile device or computer when a replacement or maintenance event in the near future might be necessary, depending on the period of time desired by the user for receiving a reminder or warning. Such messages can be generated by alert generation module 210.

In different embodiments, a user can use the interface provided by application 250 to change the user settings 220 that may be stored in the cloud, and automatically update the corresponding settings and information. The application can offer a user interface that may be accessed via any user computing device configured for connection to a network. In different embodiments, the application 250 can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touchscreen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition, the client device 292 can access (either via local storage or through a cloud storage service or account) an electronic content repository from which information about a wide range of products is obtained and presented to the user. For example, a product database 206 may be maintained in which details about the selected product or item can be viewed. The product database 206 can be used to store information and data regarding products for use by application 250. The product database 206 can be populated, accessed, and/or updated by a controller, a point-of-sale terminal, a user device, etc. For example, the product database 206 may be maintained by employees associated with the server 202, and/or by crowd-sourced data generation whereby users of the application 250 add or update information about products they encounter. In another example, items can be added to the product database 206 by manufacturers or retailers of the proposed products. The information is collected to produce a product database that is relatively large with a plurality of attributes related to one or more specific products.

In different embodiments, the product database 206 includes a product identifier field which may contain identifiers or other identifying information for products or services, such as a name, barcode, or other identifier codes, an installation description field which may include descriptive information for the assembly, use, or installation of the product, a supplemental items field for listing the tools, services, or other items that are required and/or recommended to employ the product, and a category field which may include information regarding the category for the product. In some embodiments, the product database 206 may also include information regarding the retail price of the products, or alternative product suggestions. In some embodiments, images of the product and/or supplemental items may be included.

Figure 7A:
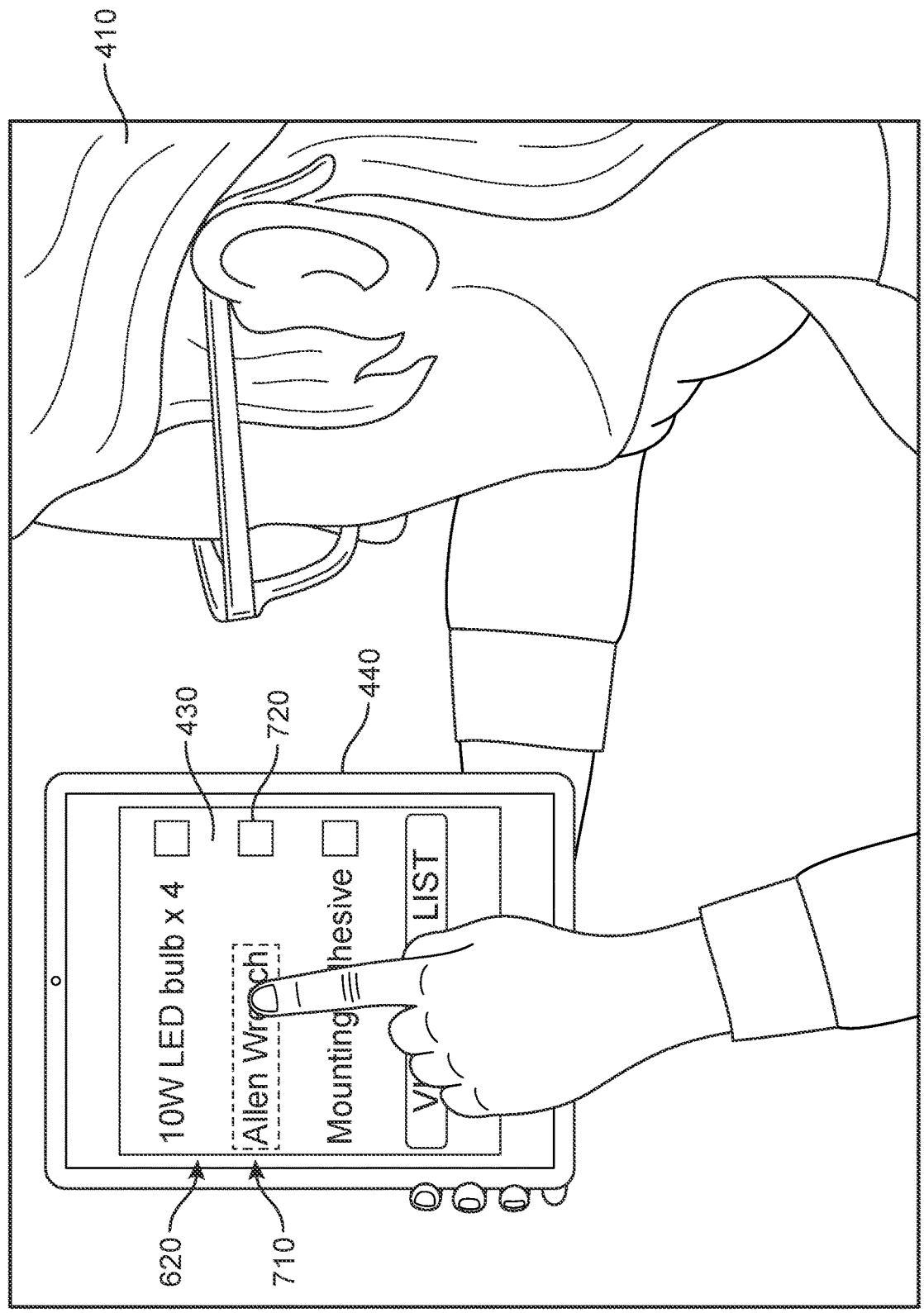
FIG. 7A is an illustration of the user of FIG. 6 viewing the shopping list where one item is being selected for obtaining additional information, according to an embodiment.
Figure 7B:
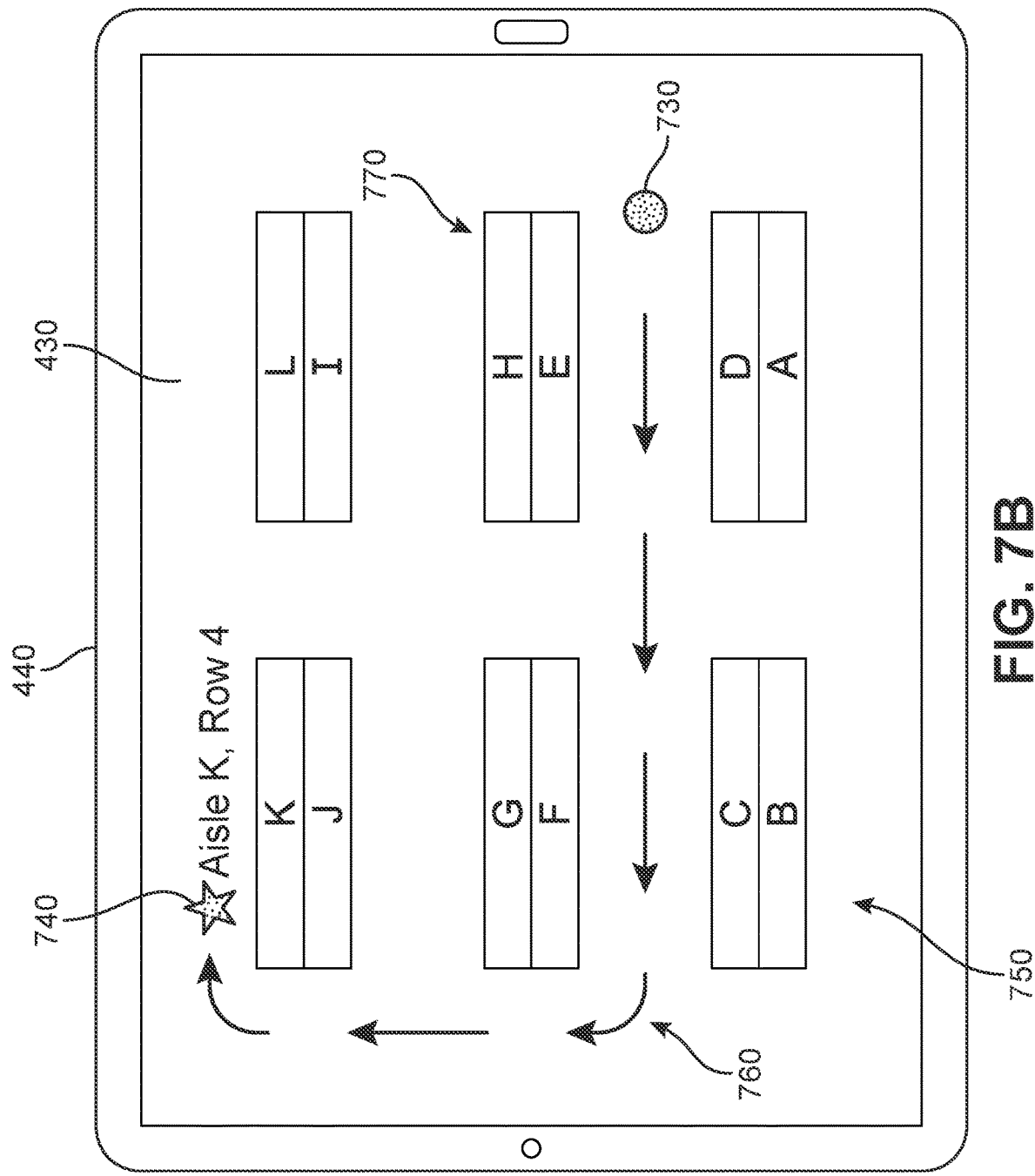
FIG. 7B is an illustration of the mobile device of FIG. 7A displaying navigation instructions from the user's current location to the location of the selected item in the same store, according to an embodiment.

As will be discussed below with respect to FIG. 7B, in some embodiments, the application 250 is configured to provide directions to one or more items identified by the system as being necessary for use of the selected product. In such cases, the system may include or access a store layout database 208. The store layout database 208 can include an up-to-date inventory and/or location information for products in the store the user is currently shopping at, as well as information about the availability and location of such item(s) at nearby retailers. In some embodiments, the store layout database 208 can include maps or schematics of a retailer's store location.

Furthermore, as will be discussed below with respect to FIG. 9, in some embodiments, the system 200 is configured to communicate via networks 290 to present messages to a user through their vehicle's onboard computing system 222. In other words, the server 202 can generate alerts via alert generation module 210 when navigation system 270 detects that the user has left the store without verifying that they have obtained all of the necessary tools or items. In one embodiment, the alert generation module 210 can transmit an override command to the onboard computing system 222 to block or delay a car from starting until the user has acknowledged or dismissed the alert message or otherwise confirms that they have the necessary products. In different embodiments, the onboard computing system 222 can include a single computing device, or a network of multiple computing devices. Onboard computing system 222 could be associated with one or more electronic control units (ECUs), such as one or more processors and memory, such as a non-transitory computer readable medium. Instructions stored within memory may be executed by the one or more processors. The onboard computing system 222 may also include one or more communication components, such as cellular network components for communicating over cellular networks, Wi-Fi components for communicating over Wi-Fi networks, and other communication components.

In different embodiments, the client device 292 may also include or make use of a more comprehensive smart assistant platform which is configured to provide an array of other functions, including a microphone for receiving voice commands and/or a display for viewing information and inputting touch inputs. For example, the client devices may be configured to perform the functionality of a digital assistant. As described herein, a digital assistant may include any process that executes on a computing device to receive requests from a user, perform operation(s) to process the request, and/or provide result(s) of the operation(s) to the user. A digital assistant may also be described as a personal digital assistant or virtual assistant. A digital assistant may be configured to process requests that are provided by the user as voice commands, inputs to a graphical user interface, or through other types of input. In some examples, a digital assistant may detect speech input that includes utterance(s) by the user, interpret the speech input to determine the user's request, and process the request appropriately. For example, the user may ask the digital assistant to add an item to a shopping cart of the user, such as a shopping cart provided by an online shopping and/or e-commerce service. The digital assistant may process the request by identifying the specified item and adding that item to the user's shopping cart. As another example, the user may ask the digital assistant to look up information regarding a business, such as the address, phone number, and so forth. The digital assistant may perform operations to access the requested information, and provide (e.g., audio) output describing the requested information.

In some examples, a digital assistant may be provided by a hardware manufacturer, such as a mobile device manufacturer, and/or an operating system (OS) provider. Examples of such digital assistants include: Alexa™, provided by Amazon®, Siri™, provided by Apple Inc®.; Google Now™, provided by Google, Inc®.; and Cortana™, provided by Microsoft Corp®. In some instances, the device manufacturer and/or OS provider that provided the digital assistant may also have manufactured or otherwise provided the hardware and/or software of the computing device where the digital assistant executes. Such digital assistants may be configured to perform various types of operations in response to various requests, and may be described as general-purpose digital assistants. One or more digital assistants may also be provided by various service providers, and may be configured to perform more specific types of operations related to the service and/or specialty of each service provider. For example, a financial services organization such as a bank, investment broker, insurance company, and so forth, may provide an application (e.g., a mobile app) that executes on a user's computing device to provide services related to banking, investments, insurance, and so forth. The application may include a digital assistant that processes user requests associated with the provided services. For example, a user may ask, via the digital assistant on his client device, for the system to display a list of tools needed for a particular product. In other words, while in some embodiments, the application 250 may be used as a touch-based or other manual input-based interface, in other cases the application 250 may be configured to operate in conjunction with a digital assistant system for providing and enabling intelligent interactions and actions with and for a user.

Figure 3:
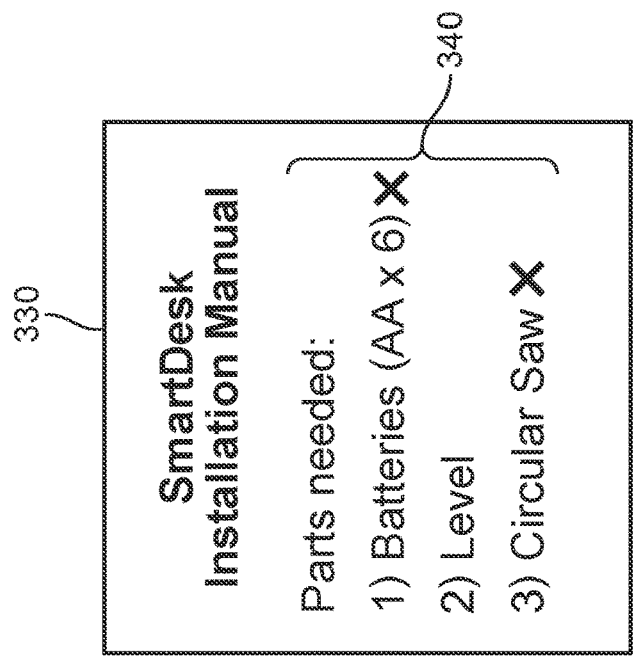
FIG. 3 is an illustration of a user experiencing frustration upon realizing she lacks tools needed to assemble a recently purchased desk, according to an embodiment.
Figure 3:
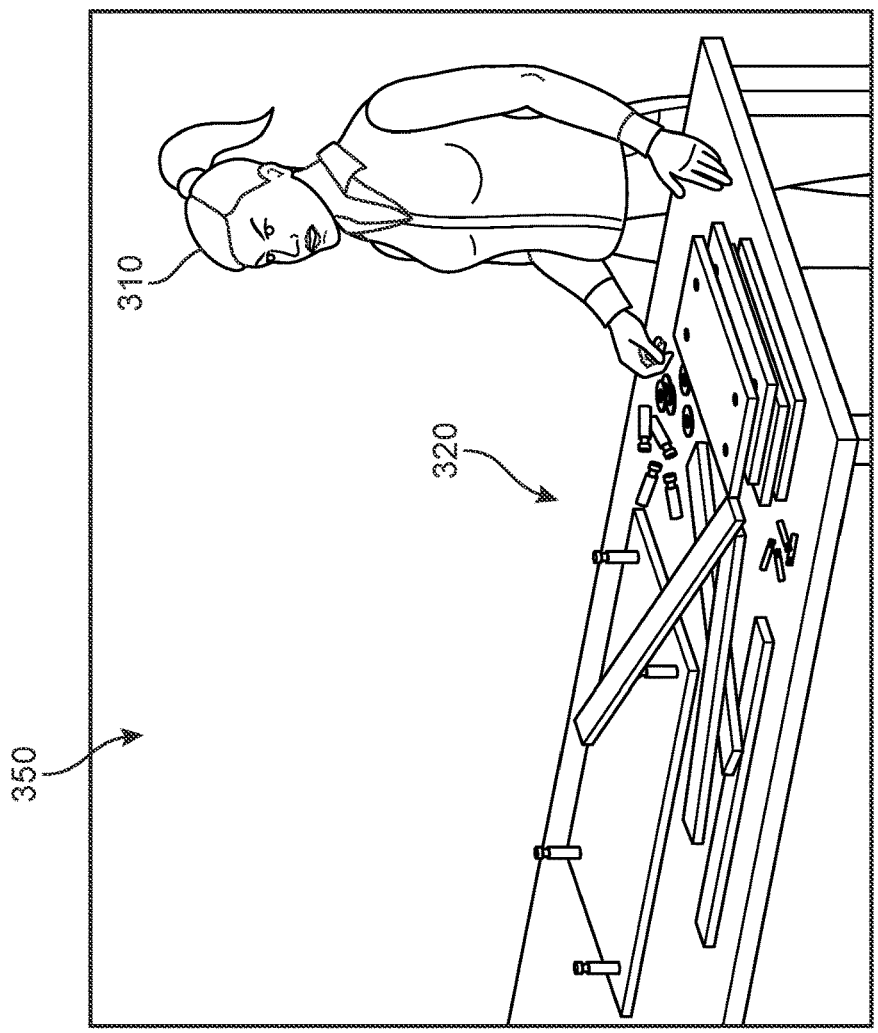

Referring now to FIGS. 3-9, a sequence of drawings illustrates an example of some advantages and uses of a smart shopping assistant system ("system") during everyday activities. In FIG. 3, a second user 310 has arrived back at their home 350 with a purchase (in this example a "Bright Light Desk"). The second user 310 has unpacked the item and pieces of a desk 320 are strewn on a table. An installation manual 330 included with the desk 320 lists some supplemental tools and parts 340 that will be needed. It is at this point that second user 310 realizes that she will be unable to proceed with the assembly of the desk 320 because she does not have a circular saw or AA batteries. Having already gone out shopping for this desk and returned home, she experiences frustration at having to return to the store for more items and expend both time and money that she had not planned on for this product. If she had known of these supplemental items earlier, she might have either purchased them while she purchased the desk 320, or selected a different desk that was easier to assemble, or required items that she already had in her home 350.

Figure 4:
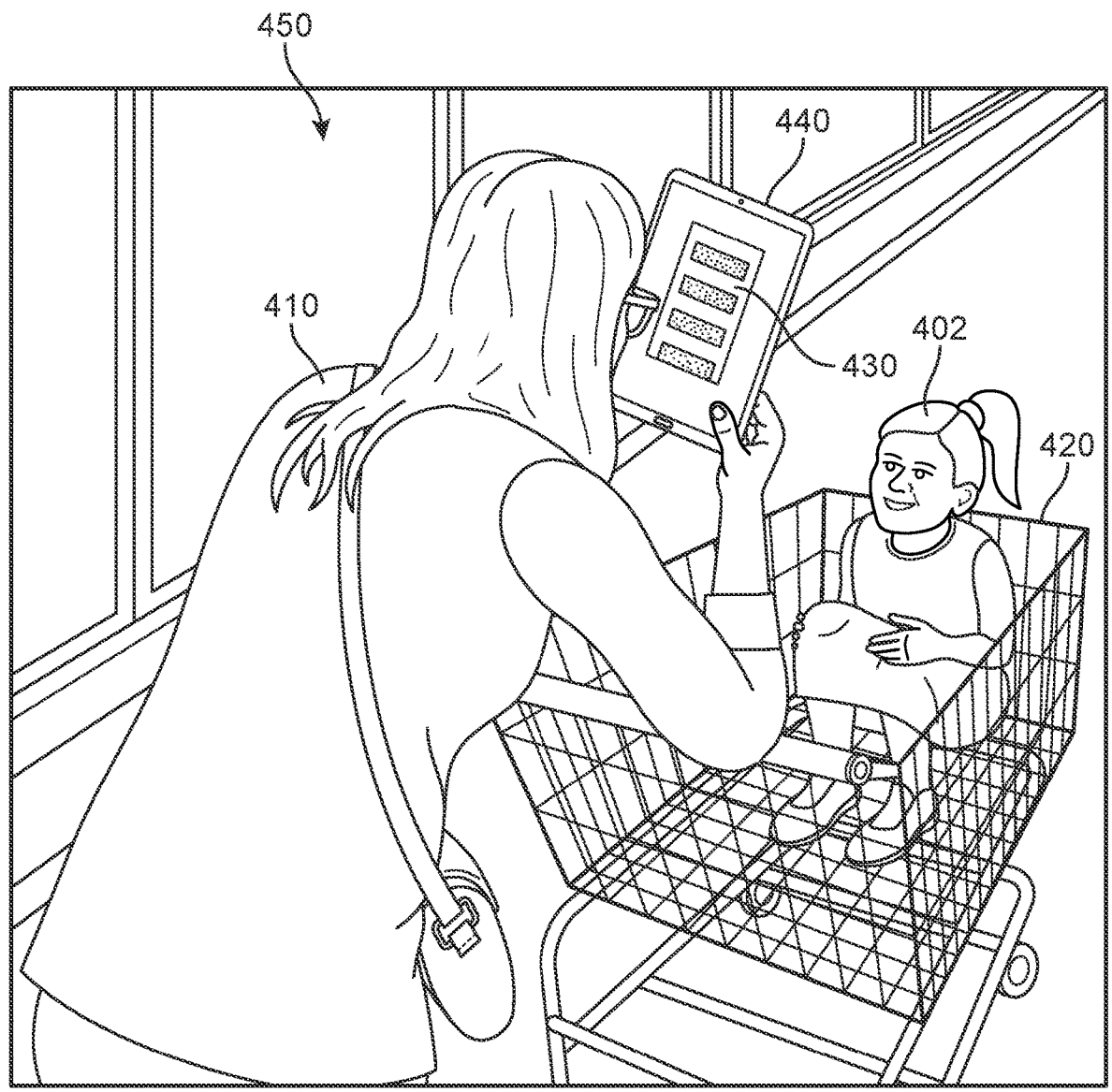
FIG. 4 is an illustration of a user at a retail store accessing her smart assistant via a mobile device, according to an embodiment.

In FIG. 4, a third user 410 is shown pushing a shopping cart 420 with her child 402 as she browses items at a furniture store 450. The third user 410 is also holding a mobile device 440 (such as a smartphone, smartwatch, or tablet). During her shopping trip, the third user 410 may wish to understand in greater detail what will be needed in order for her to successfully implement a new purchase from the store 450. She accesses a smart assistant application ("application") 430 via her mobile device 440, which allows her to submit an input related to the proposed purchase. In some embodiments, the third user 410 may type or provide a voice input that identifies the specific product, while in other embodiments the third user 410 can capture information associated with the product via a sensor such as a camera or scanner included in the mobile device 440.

Figure 5:
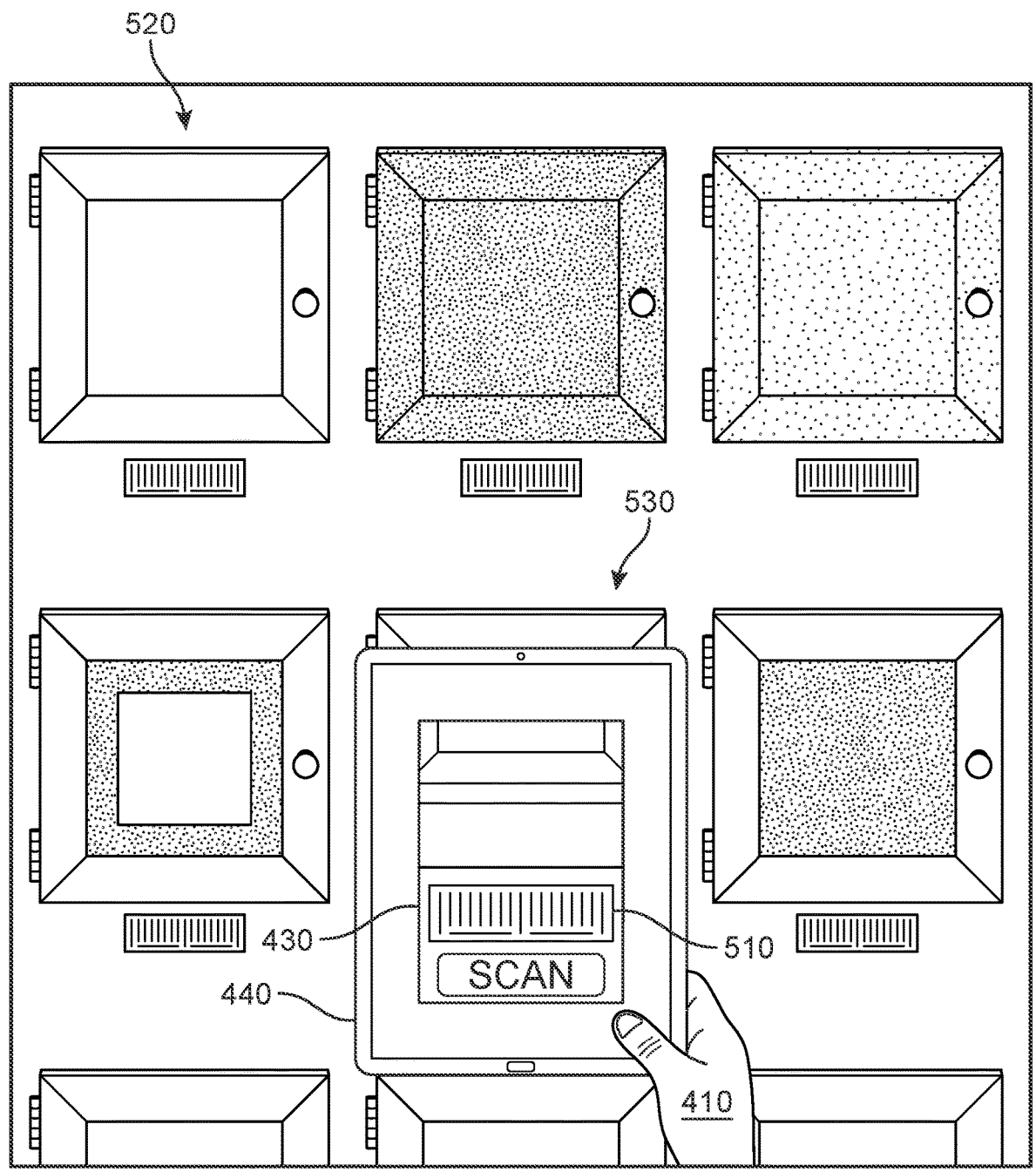
FIG. 5 is an illustration of the user of FIG. 4 viewing a set of cabinets for sale and scanning a code associated with one of the bookshelf cabinets, according to an embodiment.

Referring now to FIG. 5, the third user 410 (represented in this figure by a hand) faces toward an arrangement of cabinet samples 520 representing different cabinet surfaces and colors. In some embodiments, each product can include a tag attached to or associated with the product in the retail establishment. This tag can be scanned by third user 410 via mobile device 440. In different embodiments, such a process may be accomplished in a variety of ways using any number of different scanning technologies currently known to those of ordinary skill in such areas of technology. For example, the price tag of a product may include a barcode that may contain such information as price, serial number, and/or other product identification information. As a general matter, a barcode refers to a machine-readable representation of information (usually dark ink on a light background to create high and low reflectance which is converted to 1s and 0s). Originally, barcodes stored data in the widths and spacings of printed parallel lines, but now they can also be represented by patterns of dots, concentric circles, and text codes hidden within images. Barcodes can be read by optical scanners called barcode readers or scanned from an image by special software, which may be integrated in or accessed by application 430. Barcodes are widely used to implement Auto ID Data Capture (AIDC) systems that improve the speed and accuracy of computer data entry. An advantage over other methods of AIDC is that it is less expensive to implement. The best-known and most widespread use of barcodes has been on consumer products using the Universal Product Code (UPC) symbol.

In other embodiments, the user of a mobile device may scan the tag attached to or associated with a product in a retail establishment using Radio-frequency identification (RFID) technologies. RFID is an automatic identification method, relying on storing and remotely retrieving data using devices called RFID tags or transponders. An RFID tag is an object that can be applied to or incorporated into a product, animal, or person for the purpose of identification using radio waves. Some tags can be read from several meters away and beyond the line of sight of the reader. Most RFID tags contain at least two parts: one is an integrated circuit for storing and processing information, modulating and demodulating a (RF) signal and can also be used for other specialized functions, and a second is an antenna for receiving and transmitting the signal. A technology called chip-less RFID allows for discrete identification of tags without an integrated circuit, thereby allowing tags to be printed directly onto assets at lower cost than traditional tags.

Figure 6:
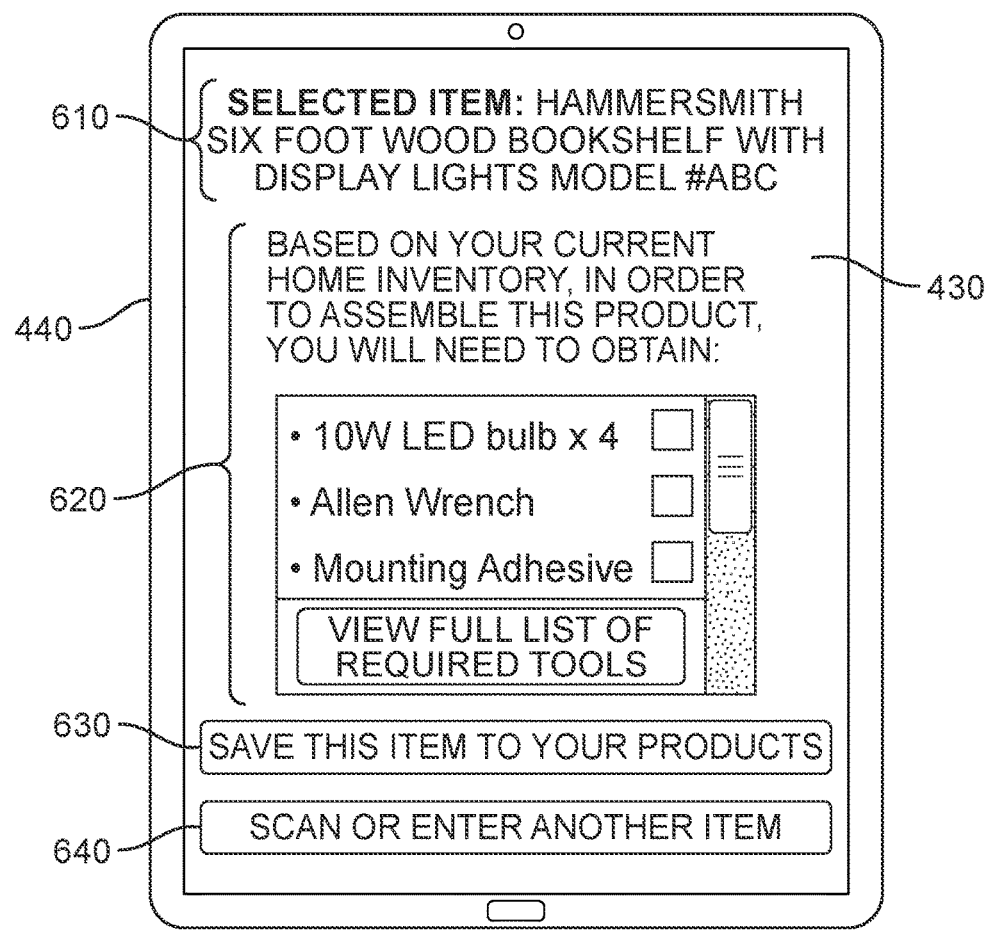
FIG. 6 is an illustration of the user of FIG. 5 interacting with the smart assistant application to determine what other supplemental items may be needed in order for her to utilize the selected product, according to an embodiment.
Figure 6:
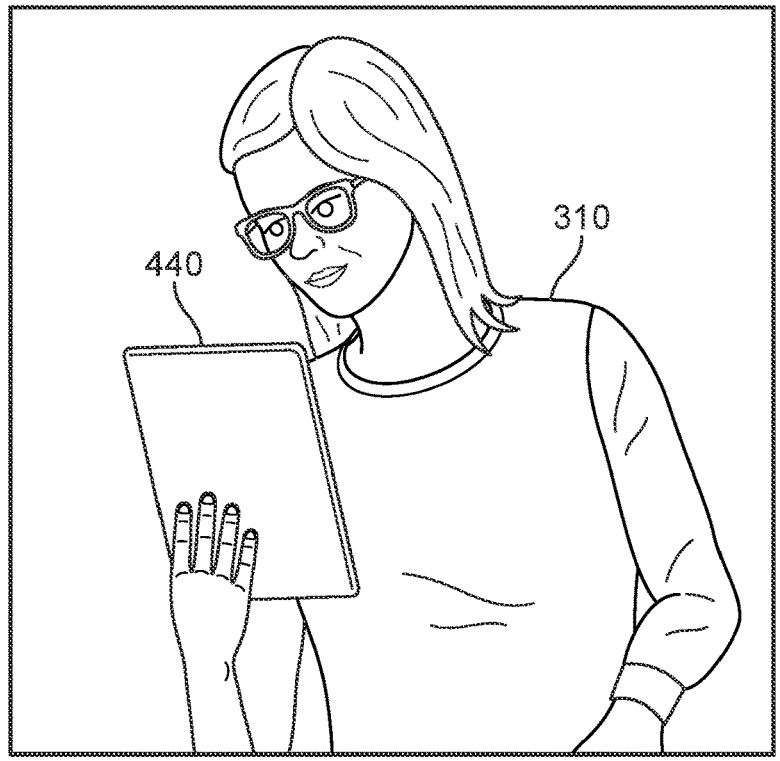

Once the product identification has been inputted, other product specific information is retrieved either with reference to a locally stored database on mobile device 440, or following transmission of the identifying information over a network to a cloud product database (see FIG. 2). In FIG. 6, the product has been identified and the application 430 automatically presents the desired information under an identifier header 610 ("Selected Item: Hammersmith Six Foot Wood Cabinet With Display Lights, Model #ABC). Below this header 610 is a list of required tools ("list") 620 ("Based on your current home inventory, in order to assemble this product, you will need to obtain:") that includes a 10 W LED bulb×4, an Allen Wrench, and Mounting Adhesive. In some cases, only those items that the user does not have in her inventory (based on her inventory database) will be displayed, with an option to view the full list of required tools. In different embodiments, additional options may be provided, such as a first option 630 ("Save this item to Your Products") to add the currently selected product to a wish or other list, as well as a second option 640 ("Scan or enter another item") to cancel the current product and submit a different product.

In some embodiments, the product information can be harvested from other online sources such as a product search/comparison engine or published product descriptions for various manufacturers or stores based on the data transmitted from the mobile device 440. The product data results can then be transmitted back to the user's wireless device. However, in addition to or as an alternative to displaying the product information on the mobile device, the product information may be communicated to and displayed on a variety of different locations and devices including, but not limited to: the same or another user's home computer via email, web posting or other electronic messaging service, another cellular or mobile computing device of the same or another user, a computing device of another retailer or vendor, or a printer. This can allow the user to readily communicate with other family members or friends about the product and whether its implementation is feasible. In some cases, the user may determine whether to purchase the item immediately at the store where the item was scanned or purchase the item later after consultation with others. Also, in different embodiments, the user may set a variety of different options to be performed automatically based upon the submitted product. For example, the user may wish to have a list of recommended alternatives (i.e., similar items) displayed automatically that may be implemented without the acquisition of any additional items or tools along with directions to the recommended alternatives.

In different embodiments, the system can include provisions to receive user inputs and otherwise allow the user to engage with the presented content. In FIG. 7A, the third user 410 reviews a first portion 710 of the list 620, which is now presented in an enlarged view. In the example of FIG. 7A, it can be seen that each list item also corresponds to a selectable option 720, as well as an adjacent checkbox. The third user 410 is shown raising her left arm and making a tapping gesture onto a first region of the user interface appearing to correspond to a first selectable option associated with a second list item ("Allen Wrench"). The system is configured to detect this type of gesture and determine if the tap(s) were associated with a region of the display on which a selectable option was shown.

Thus, in some embodiments, the mobile device 440 includes a display that also functions as a touchscreen interface. In other words, in different embodiments, touch operations may be performed by touching the touchscreen by using an appropriate part or object such as a finger or a stylus in order to interact with application options. In one embodiment, the touchscreen includes a touch-sensitive surface as well as serving as a display. The touch-sensitive surface is used to perform various operations related to detection of contact, such as determining whether contact has occurred (for example, detecting a finger press event), determining whether there is a contact movement and tracking the movement on the entire touch-sensitive surface (for example, detecting a drag or swipe event by one or more fingers), and determining whether the contact has been terminated (for example, detecting a finger lift event or a contact interruption). For example, determining a movement of a contact point may include determining a speed (a value), a velocity (a value and a direction), and/or an acceleration (a change of a value and/or a direction) of the contact point. In this case, as depicted in FIG. 7A, the tapping gesture is received by the system as a selection of the second list item. In other embodiments, other types of selection inputs may be used.

In response, the application 430 can be configured to present information specific to the selected item, such as a description of item, an image of item, an estimated price for the item, alternate items that can serve the same purpose as the selected item, and/or information to help the user locate the item, either at the current store or at another store near the user's current location. As one non-limiting example of such a presentation, the application 430 is shown providing a map 750 on the display of mobile device 440. The map 750 includes a layout 770 of the store in which user is currently shopping, including a first symbol 730 indicating the user's present location in the store and a second symbol 740 indicating the general location of the selected item, such as the shelves with relevant items (here Aisle K, Row 4). In addition, a suggested route or path 760 superimposed on the map from the first symbol 730 to the second symbol 740 is shown to guide the user to the destination. In other embodiments, the map 750 can also include landmarks such as the entrance to the store, the checkout locations and any other obstacles. The path 760 is automatically updated as the user's position changes.

Figure 8A:
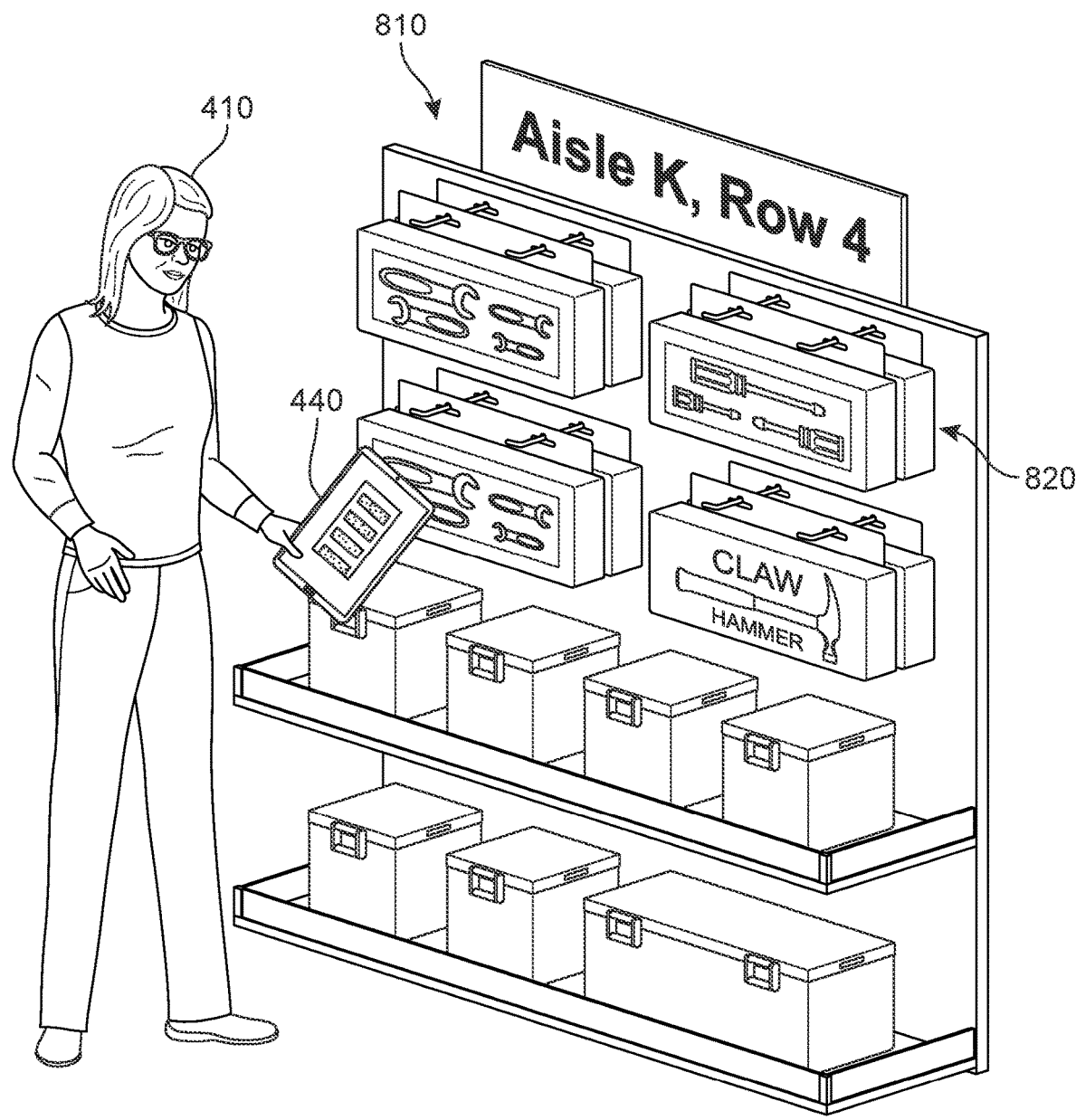
FIG. 8A is an illustration of the user arriving at the location of the selected item in the store, according to an embodiment.
Figure 8B:
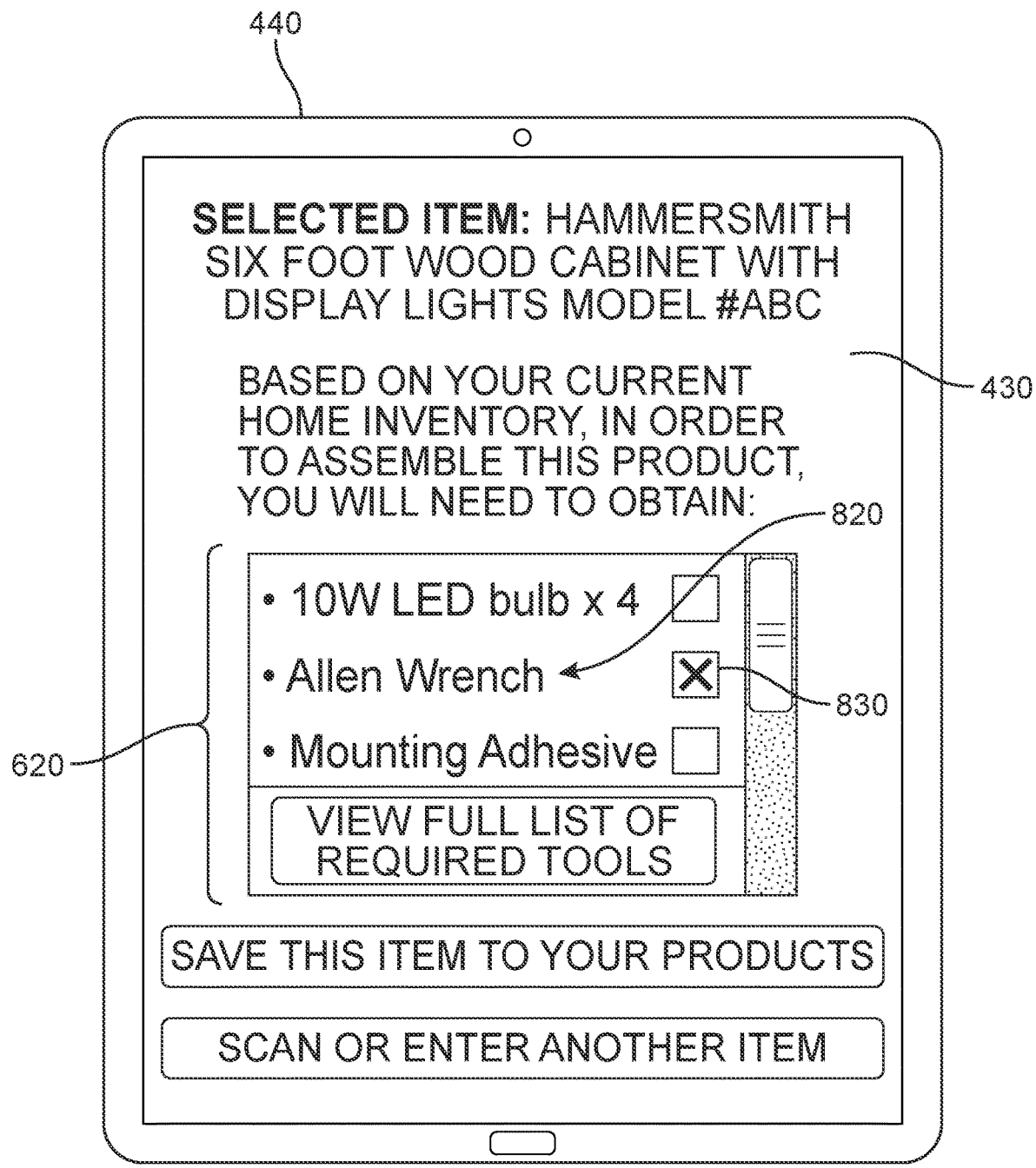
FIG. 8B is an illustration of the mobile device of FIG. 7A displaying the supplemental information for the selected product, according to an embodiment.

In FIG. 8A, the third user 410 has arrived at designated end-point 810 (Aisle K, Row 4) and is viewing the available tools. Once she obtains the desired tool 820, she can return her attention to mobile device 440. In FIG. 8B, she views the application 430 to submit an input to the list 620. For example, following the acquisition of Allen Wrench 820, the third user can tap checkbox to indicate that the item is no longer missing on the list 620. This input and resulting change to the list 620 can also be reflected in the record stored in application 430 and any other cloud storage or application account configured to store information, such that any subsequent access of the application 430 can refer to an updated user's inventory that now includes the new item. In other words, in some embodiments, all changes, including additions, deletions, and/or modifications made to the data through the interface will be reflected in the 'home' data file location from which the data is being supplied or where the user has configured the system to store and transmit the data.

Figure 9:
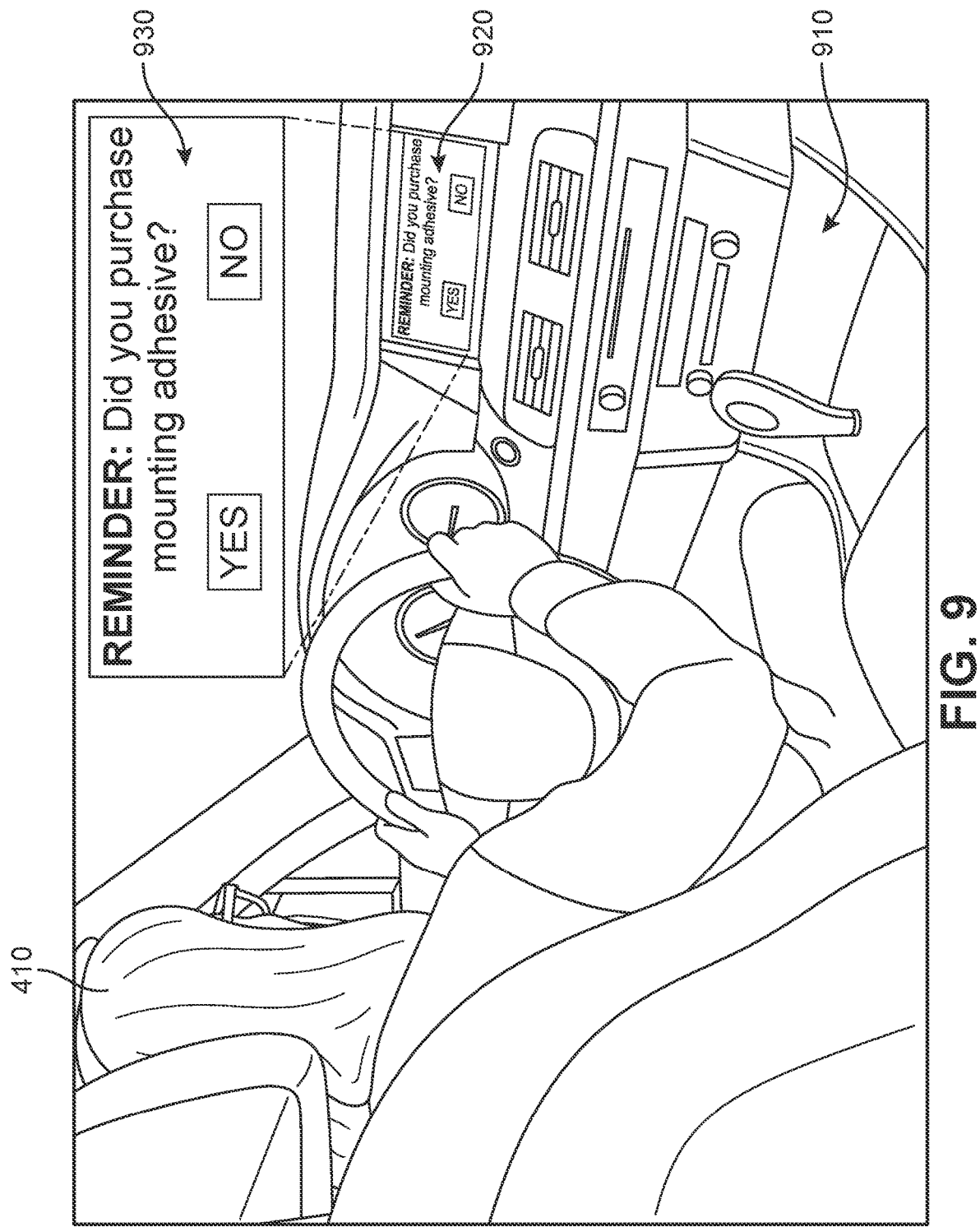
FIG. 9 is an illustration of a user seated in her vehicle and receiving a reminder about a missing item from her supplemental list of items, according to an embodiment.

In FIG. 9, the third user 410 has completed her shopping trip and returned to her vehicle 910. In cases where the user's vehicle includes an onboard computing system (see FIG. 2) the smart assistant system can be configured to communicate with the onboard computing system to improve the shopping experience for the user. In this example, the smart assistant system can transmit a message 930, for example via an onboard vehicle display 920. In FIG. 9, the message 930 ("REMINDER: Did you purchase mounting adhesive?") reflects a determination by the smart assistant system that one or more tools required by one of the purchased items was not checked off. In some embodiments, the onboard computing system can prevent the car from being started until the message 930 has been acknowledged (for example, via the "YES" or "NO" options) or the item is checked off.

It should be understood that while the proposed systems and methods are illustrated for use during on-site shopping excursions, in different embodiments, the smart shopping assistant application may be employed for use at home, for example, during online shopping sessions, or for previewing the supplemental items that will be needed for a product that is being considered for purchase (prior to the shopping excursion). For example, a user may engage in an online shopping session and refer to the smart assistant application to determine whether any supplemental items also should be purchased during the current shopping session or prior to the delivery or pick up of the purchased product. Such a determination may also lead the user to select a different product, one that does not require a particular supplemental item. In another example, the user may review the list of supplemental items and reach out to acquaintances to ask if certain items from the list may be borrowed or obtained in advance of their purchase, providing additional confidence in their purchase of the product.

Figure 10:
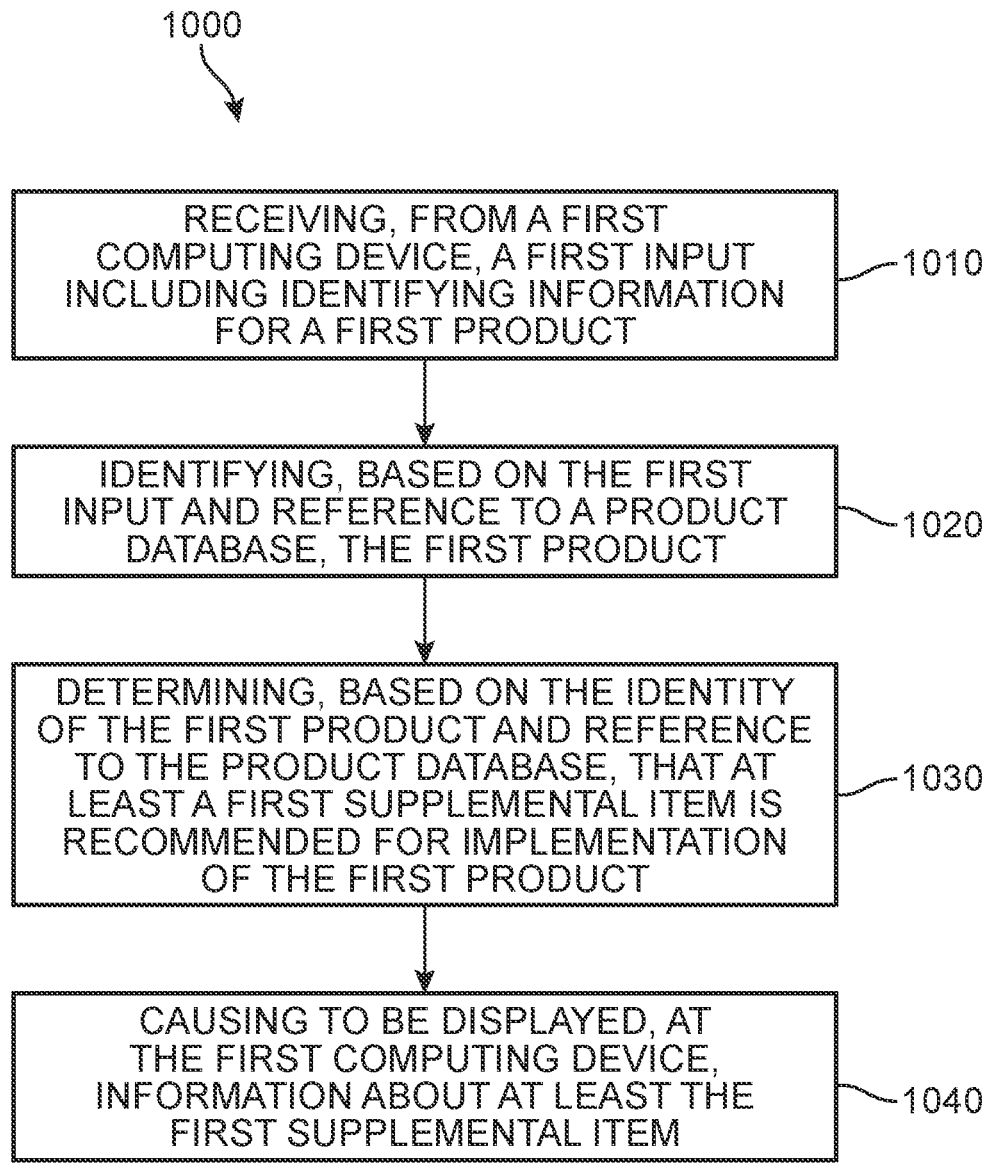
FIG. 10 is a flow chart of a process of accessing content from a smart assistant system, according to an embodiment.

FIG. 10 is a flow chart illustrating an embodiment of a method 1000 of providing product-specific information to a user. In a first step 1010 the method includes receiving, from a first computing device, a first input including identifying information for a first product and a second step 1020 of identifying, based on the first input and reference to a product database, the first product. The method 1000 also includes a third step 1030 of determining, based on the identity of the first product and reference to the product database, that at least a first supplemental item is recommended for implementation of the first product, and a fourth step 1040 of causing to be displayed, at the first computing device, information about at least the first supplemental item.

In other embodiments, the method may include additional steps or aspects. In one embodiment, the information about the first supplemental item includes a brief description of the first supplemental item. In such cases, a selectable or actuatable option can also be presented, and selection of the first supplemental item causes detailed information about the selected first supplemental item to be displayed including one or more of cost, location, and images of the selected first supplemental item. In another example, the method also includes receiving, from the first computing device, a second input corresponding to a request for additional information about the first supplemental item and a third input including data corresponding to a first location of the first computing device, and causing to be displayed at the first computing device, in response to the second input, a map in which the first location and a second location of the first supplemental item are both shown. In some embodiments, the method may then also include steps such as causing to be displayed, at the first computing device, a first suggested route from the first location to the second location, receiving, from the first computing device, data corresponding to a third location of the first computing device, and causing to be displayed, at the first computing device, an updated, second suggested route from the third location to the second location.

In some embodiments, the method can also include receiving, from a second computing device, a second input corresponding to an identification of items that have been previously acquired, and then generating and storing an inventory list of previously acquired items. In other words, a user may enroll and create an account via the application, and then compile a list of common tools or other items in their home that can be used in conjunction with other products. In some cases, the application may present a list of tools or other common supplemental items which the user can peruse and 'check off' those items that he or she already possesses. This list will be stored in the user's account for later reference by the user and/or system, and can be updated at any time, either by the user, or automatically by the system upon receiving confirmation that the user has since acquired a particular item. As noted above with respect to FIG. 2, the user can also modify their preferences and maintain a record of their shopping history using this account.

In addition, the method can include determining that a second supplemental item and a third supplemental item are also recommended for implementation of the first product, determining that the second supplemental item is included in the inventory list (and not the third supplemental item), and then causing to be displayed, at the first computing device, information about only the first supplemental item and the third supplemental item because the second supplemental item is already noted as being in the possession of the user and is therefore will not need to be purchased or otherwise acquired. In addition, in such cases, the method may further include steps of receiving, from the first computing device, a third input corresponding to an indication that the first supplemental item has been obtained, and updating the inventory list to include the first supplemental item. Thus, future shopping excursions that identify a product that requires the first supplemental item will not present the first supplemental item to the user as it is understood that the user already owns the first supplemental item.

In another example, the method also includes receiving, from an onboard computing system for a vehicle associated with the user, a signal that the user is in the vehicle, and causing to be presented, via the onboard computing system, a message alerting the user that the first supplemental item was not obtained. In some cases, the method can further include causing the onboard computing system to require acknowledgement of the message before permitting the vehicle to start (i.e., transmitting a request to the onboard computing system to block attempts to start the car until acknowledgement of the message is received). In one embodiment, the method also includes receiving, from the onboard computing system, a second input indicating acknowledgement of the message, and thereby causing the onboard computing system to permit the vehicle to start. In different embodiments, the first input can be one of a bar code, image, or text description of the first product.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing product-specific information to a user, the method comprising:
   receiving, from a first computing device, a first input including identifying information for a first product;
   identifying, based on the first input and reference to a product database, the first product;
   determining, based on the identity of the first product and reference to the product database, that at least a first supplemental item is recommended for implementation of the first product;
   causing to be displayed, at the first computing device, information about at least the first supplemental item;
   receiving, from an onboard computing system for a vehicle associated with the user, a signal that the user is in the vehicle;
   causing to be presented, via the onboard computing system, a message alerting the user that the first supplemental item was not obtained; and
   causing the onboard computing system to require acknowledgement of the message before permitting the vehicle to start.

2. The method of claim 1, wherein the information about the first supplemental item includes a brief description of the first supplemental item, and selection of the first supplemental item causes detailed information about the selected first supplemental item to be displayed including one or more of cost, location, and images of the selected first supplemental item.

3. The method of claim 1, further comprising:
   receiving, from the first computing device, a second input corresponding to a request for additional information about the first supplemental item and a third input including data corresponding to a first location of the first computing device; and
   causing to be displayed at the first computing device, in response to the second input, a map in which the first location and a second location of the first supplemental item are both shown.

4. The method of claim 3, further comprising:
   causing to be displayed, at the first computing device, a first suggested route from the first location to the second location;
   receiving, from the first computing device, data corresponding to a third location of the first computing device; and
   causing to be displayed, at the first computing device, an updated, second suggested route from the third location to the second location.

5. The method of claim 1, further comprising:
   receiving, from a second computing device, a second input corresponding to an identification of items that have been previously acquired;
   generating and storing an inventory list of previously acquired items;
   determining that a second supplemental item and a third supplemental item are also recommended for implementation of the first product;
   determining that the second supplemental item is included in the inventory list; and
   causing to be displayed, at the first computing device, information about only the first supplemental item and the third supplemental item.

6. The method of claim 5, further comprising:
   receiving, from the first computing device, a third input corresponding to an indication that the first supplemental item has been obtained; and
   updating the inventory list to include the first supplemental item.

7. The method of claim 1, further comprising:
   receiving, from the onboard computing system, a second input indicating acknowledgement of the message; and
   causing the onboard computing system to permit the vehicle to start.

8. The method of claim 1, wherein the first input is one of a bar code, image, or text description of the first product.

9. A system for providing product-specific information to a user, the system comprising a processor and machine-readable media including instructions which, when executed by the processor, cause the processor to:
   receive, from a first computing device, a first input including identifying information for a first product;
   identify, based on the first input and reference to a product database, the first product;

determine, based on the identity of the first product and reference to the product database, that at least a first supplemental item is recommended for implementation of the first product;

cause to be displayed, at the first computing device, information about at least the first supplemental item;

receive, from an onboard computing system for a vehicle associated with the user, a signal that the user is in the vehicle;

cause to be presented, via the onboard computing system, a message alerting the user that the first supplemental item was not obtained; and cause the onboard computing system to require acknowledgement of the message before permitting the vehicle to start.

10. The system of claim 9, wherein the information about the first supplemental item includes a brief description of the first supplemental item, and selection of the first supplemental item causes detailed information about the selected first supplemental item to be displayed including one or more of cost, location, and images of the selected first supplemental item.

11. The system of claim 9, wherein the instructions further cause the processor to:

receive, from the first computing device, a second input corresponding to a request for additional information about the first supplemental item and a third input including data corresponding to a first location of the first computing device; and cause to be displayed at the first computing device, in response to the second input, a map in which the first location and a second location of the first supplemental item are both shown.

12. The system of claim 11, wherein the instructions further cause the processor to:

cause to be displayed, at the first computing device, a first suggested route from the first location to the second location;

receive, from the first computing device, data corresponding to a third location of the first computing device; and cause to be displayed, at the first computing device, an updated, second suggested route from the third location to the second location.

13. The system of claim 9, wherein the instructions further cause the processor to:

receive, from a second computing device, a second input corresponding to an identification of items that have been previously acquired;

generate and store an inventory list of previously acquired items;

determine that a second supplemental item and a third supplemental item are also recommended for implementation of the first product;

determine that the second supplemental item is included in the inventory list; and cause to be displayed, at the first computing device, information about only the first supplemental item and the third supplemental item.

14. The system of claim 13, wherein the instructions further cause the processor to:

receive, from the first computing device, a third input corresponding to an indication that the first supplemental item has been obtained; and update the inventory list to include the first supplemental item.

15. The system of claim 9, wherein the instructions further cause the processor to:

receive, from the onboard computing system, a second input indicating acknowledgement of the message; and cause the onboard computing system to permit the vehicle to start.

16. A system comprising one or more computers and one or more storage devices storing instructions that are operable, when executed by the one or more computers, to cause the one or more computers to:

receive, from a first computing device, a first input including identifying information for a first product;

identify, based on the first input and reference to a product database, the first product;

determine, based on the identity of the first product and reference to the product database, that at least a first supplemental item is recommended for implementation of the first product; and cause to be displayed, at the first computing device, information about at least the first supplemental item;

receive, from an onboard computing system for a vehicle associated with the user, a signal that the user is in the vehicle;

cause to be presented, via the onboard computing system, a message alerting the user that the first supplemental item was not obtained; and cause the onboard computing system to require acknowledgement of the message before permitting the vehicle to start.

* * * * *